July 14, 1931.  C. R. HARRIS  1,814,692
RACK
Filed Feb. 27, 1930
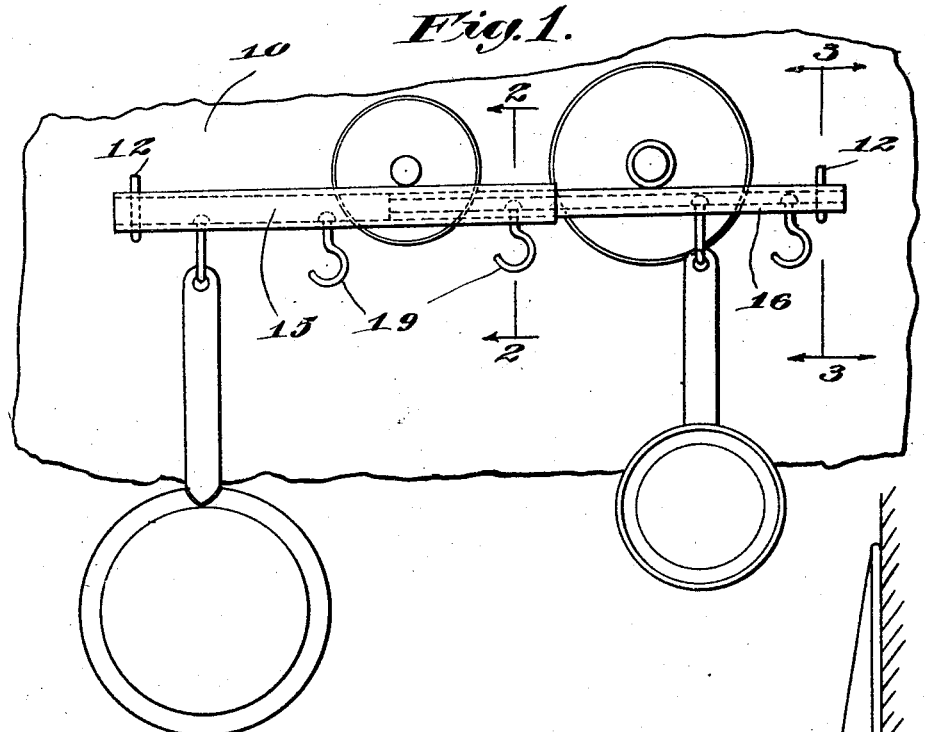
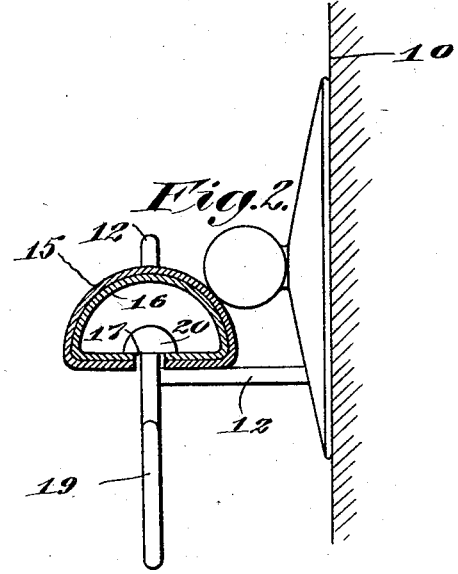

Patented July 14, 1931

1,814,692

UNITED STATES PATENT OFFICE

CHARLES R. HARRIS, OF EAST BOSTON, MASSACHUSETTS

RACK

Application filed February 27, 1930. Serial No. 431,831.

My present invention has reference to a rack which is primarily but not necessarily restricted in use for supporting kitchen utensils.

The primary object of the invention is to produce a rack comprising telescopically associated sections supported a distance away from a wall, so that utensils or utensil covers may be arranged in the space between the wall and body of the rack, while longitudinally movable through and depending from the rack are hooks to engage other utensils or the handles thereof.

A further object is to produce a utensil supporting rack which shall be of an extremely simple construction, cheaply constructed from a manufacturing point of view, easily secured to a wall or the like, and which will support thereon and therefrom a comparatively great number of utensils, including the lids therefor.

The foregoing, and other objects which will appear as the nature of the invention is better understood, may be accomplished by a construction, combination and operative association of parts, such as is disclosed by the drawings which accompany and which form a part of this specification.

In the drawings:—

Fig. 1 is a side elevation showing several utensils attached to the rack;

Fig. 2 is a transverse cross-section taken through one of the hooks;

Fig. 3 is another transverse cross-section taken through the end of the rack showing the supporting hooks.

Referring to the drawings in detail, the numeral 10 designates a vertical support, such as a wall of a kitchen or other room. In the wall 10 I screw hooks 12. The hooks are in the nature of L shaped members, the outer angle portions 14 thereof being projected vertically and passed through openings adjacent to the ends of substantially tubular telescopic members 15 and 16 respectively, the said members providing the body of the rack. The space between the body of the rack and the wall 10 provides for the reception of certain classes of utensils and for the covers thereof that are provided with knobs. The member 16 is telescoped to the member 15, and both the members 15 and 16 have their under faces formed with aligning longitudinal slots 17 and 18 respectively. Through these slots there are passed hooks 19. Each hook has its end provided with a head 20, and the head of each of the hooks is of a size whereby the same cannot pass through the slots 17 and 18, it being therefore necessary to insert the hooks through the ends of the rack body. The hooks 19 are designed to be received through the eyes or openings in the handle or other portions of utensils, and it will be noted that a rack, as above described, will support thereon, in proper spaced relation to each other, a comparatively great number of kitchen utensils or as a matter of fact other articles. The members 15 and 16 are not necessarily circular in cross-section, it being preferable that the bottom portions thereof be of a flat construction, and if desired the upper or body portions may be other than rounded in cross-section, it being of course essential that the members be hollow.

Having thus described my invention, what I claim as new, is:

A rack comprising two hollow semi-circular telescopically associated sections each having its under face flattened and provided with an aligning slot, hooks passed through the slots and having head portions which bridge the slots and rest on the bottom wall of the rack section, said rack sections having openings adjacent their ends, hooks screwed in a support and having their backs passed through said openings whereby to sustain the rack body away from the support, as and for the purpose set forth.

In testimony whereof I have affixed my signature.

CHARLES R. HARRIS.